US008886408B2

(12) United States Patent
Ellis

(10) Patent No.: US 8,886,408 B2
(45) Date of Patent: Nov. 11, 2014

(54) VEHICLE STEERING CONTROL SYSTEM AND METHOD

(75) Inventor: Nathaniel Ellis, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 112 days.

(21) Appl. No.: 13/361,306

(22) Filed: Jan. 30, 2012

(65) Prior Publication Data
US 2013/0197757 A1 Aug. 1, 2013

(51) Int. Cl.
B62D 5/04 (2006.01)
B62D 6/00 (2006.01)

(52) U.S. Cl.
CPC .............. B62D 5/0463 (2013.01); B62D 6/007 (2013.01)
USPC ................. 701/41; 701/42; 180/446

(58) Field of Classification Search
CPC ...... B62D 5/0463; B62D 5/064; B62D 5/065; B62D 6/007; B62D 6/008
USPC ............................. 701/41; 180/446
See application file for complete search history.

(56) References Cited

U.S. PATENT DOCUMENTS

| | | | |
|---|---|---|---|
| 6,152,255 A * | 11/2000 | Noro et al. ................ | 180/446 |
| 6,154,696 A | 11/2000 | Nishi et al. | |
| 6,625,530 B1 | 9/2003 | Bolourchi | |
| 6,658,335 B2 | 12/2003 | Kleinau | |
| 6,678,596 B2 | 1/2004 | Husain et al. | |
| 6,804,594 B1 | 10/2004 | Chen et al. | |
| 6,873,896 B2 | 3/2005 | Maekawa et al. | |
| 7,377,356 B2 * | 5/2008 | Turner et al. ................ | 180/446 |
| 7,472,686 B2 | 1/2009 | Yasui et al. | |
| 7,523,806 B2 | 4/2009 | Krieger et al. | |
| 7,678,005 B2 | 3/2010 | Tuckfield | |
| 7,962,262 B2 * | 6/2011 | Kobayashi ................ | 701/41 |
| 7,974,751 B2 * | 7/2011 | Ito et al. .................. | 701/41 |
| 8,080,956 B2 | 12/2011 | Wu | |
| 2005/0043874 A1 | 2/2005 | Chen et al. | |
| 2005/0251311 A1 | 11/2005 | Burton et al. | |
| 2010/0100283 A1 | 4/2010 | Hales et al. | |
| 2010/0198461 A1 | 8/2010 | Burton et al. | |
| 2010/0332082 A1 | 12/2010 | Kim | |
| 2011/0054737 A1 | 3/2011 | Naik et al. | |
| 2011/0087391 A1 | 4/2011 | Pandit et al. | |
| 2011/0307130 A1 * | 12/2011 | Gow et al. ................ | 701/22 |
| 2012/0330508 A1 * | 12/2012 | Pebley et al. ............. | 701/41 |

FOREIGN PATENT DOCUMENTS

GB 2452277 A * 3/2009 ............... B62D 6/00

OTHER PUBLICATIONS http://www.mikeharveyhonda.com/2011-honda-crz.html (printed Oct. 27, 2011), 3 pages.
http://www.hondamanuals.org/honda-67.html (printed Oct. 27, 2011), 3 pages.
http://autospeed.com/cms/title_Electric-Power-Steering/A_110661/article.html (printed Nov. 7, 2011), 6 pages.
http://foxed.ca/rx7manual/2003mazdax8/esicont/en/srvc/html/BHE061367880T01.html (printed Nov. 7, 2011) 4 pages.

* cited by examiner

Primary Examiner — John R Olszewski
Assistant Examiner — Todd Melton
(74) Attorney, Agent, or Firm — Fay Sharpe LLP

(57) ABSTRACT

A control method for an automotive vehicle steering system including an electric motor providing a steering force on a steering mechanism. The method comprises providing at least three steering system MAPs which control an electric current supplied to the electric motor. Wherein if a new MAP is selected when at least two prior selected MAPs are blending, the MAP comprising the greatest component of a blend at the time the new MAP is selected is decreased at a faster rate than the MAP comprising the lesser component.

22 Claims, 4 Drawing Sheets

VEHICLE STEERING CONTROL SYSTEM AND METHOD

BACKGROUND

Automotive engineers have developed vehicles which allow the driver to alter the driving characteristics of the car depending on their needs and/or the environment in which the car is being driven. These systems allow drivers to adapt to different road and traffic situations. For example, the driver can decide whether they wish to maximize handling, economy or a balance between the two. These multi-mode systems enable the driver to choose between driving modes which alter vehicle systems, such as, throttle and steering responsiveness, and climate control. When changing between modes, various settings of the vehicle's components are modified to yield the desired characteristics for the selected mode.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, a control method for an automotive vehicle steering system including an electric motor providing a steering force on a steering mechanism is provided. The method comprises providing at least three steering system MAPs which control an electric current supplied to the electric motor. If a new MAP is selected when at least two prior selected MAPs are blending, the deselected MAP comprising the greatest component of the blend is decreased at a faster rate than the deselected MAP comprising the lesser component of the blend.

According to a second embodiment, a control method for a steering system of an automotive vehicle having a plurality of driving modes is provided. The method includes the steps of providing an ECU storing a plurality of steering MAPs. A vehicle electronic power steering motor is also provided. The current supplied to the motor is adjustable based upon the selection of a particular steering MAP, wherein upon a change from a first to a second steering MAP, MAP blending is performed according to the following parameters:

rising rate of the new MAP (RR per millisecond) equals 100%/time in milliseconds required for complete transition to new MAP; and falling rate of the old MAP (FR per millisecond) equals $[(X)/((100-Y)RR)]$ wherein X is the existing blend percentage of the old MAP and Y is the existing blend percentage of the new MAP.

According to a further embodiment, an automotive vehicle including a steering system having an electric motor receiving a current from a drive circuit is provided. The drive circuit receives a control signal from an electronic control unit. The electric control unit includes a data processor housing a computer program designed to select a current for the electric motor and provide a control signal to the drive circuit. The computer program associates vehicle operating conditions with a MAP associated with a vehicle drive mode, wherein the computer program selectively reduces the largest component of a blending MAP at a faster rate than a smaller component of the blending MAP when a new MAP is selected.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
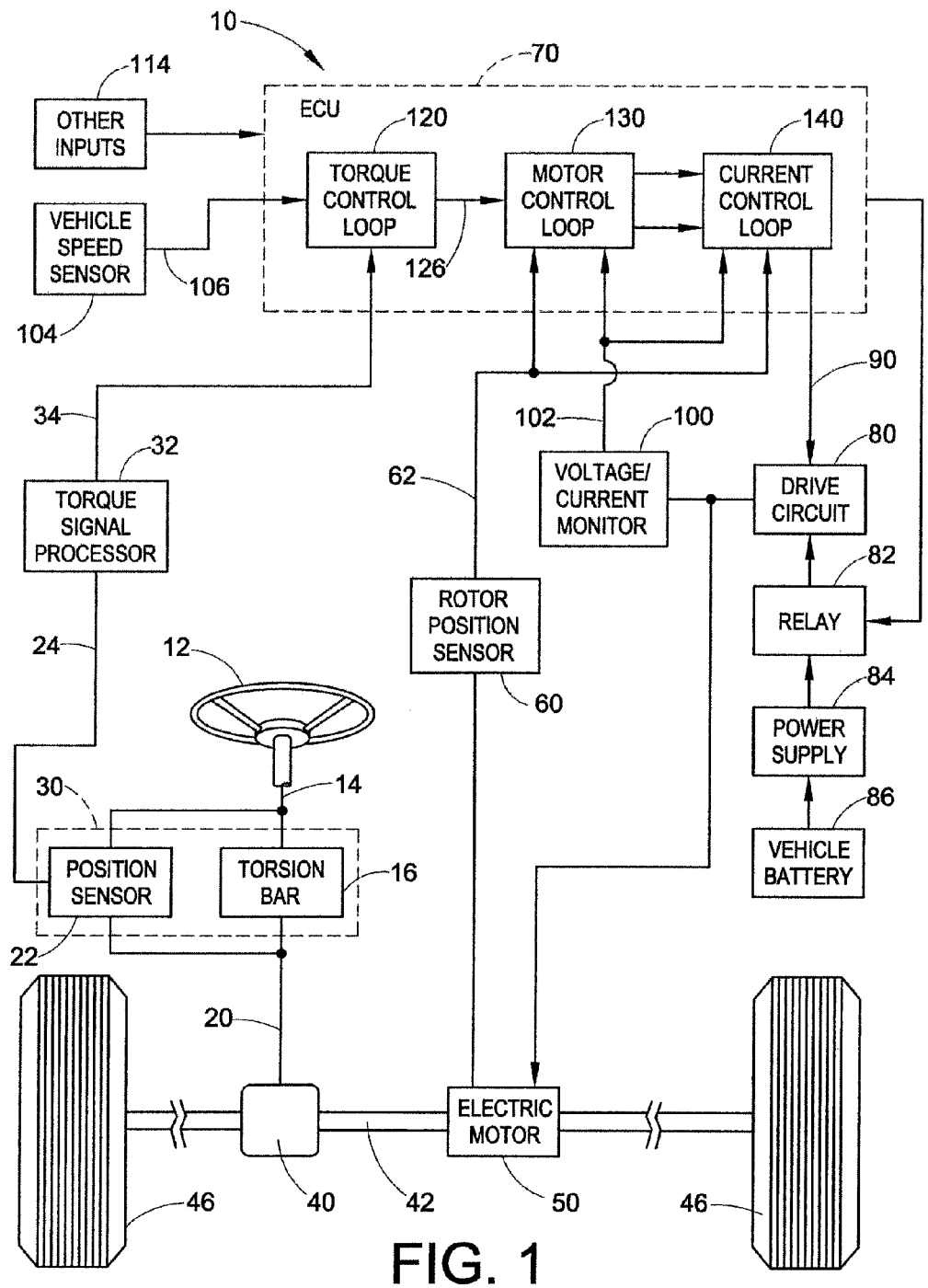
FIG. 1 is a schematic illustration of an automotive vehicle electric power assist steering system.

Electric power assist and steering-by-wire vehicle steering systems may benefit from the present disclosure. The following description is directed primarily to those systems; however, it is envisioned that application to other types of the steering methodologies or steering systems may also be advantageous.

Many automotive vehicles utilize electric motor assisted steering. For example, the hydraulic steering system may be supplemented with an electric motor to drive the hydraulic pump. This approach allows the steering effort to be controlled by varying the pump speed and allows the vehicle to have various modes of operation. For example, a driving mode can exist where driving conditions (such as city, country, highway, etc.) are automatically judged and appropriate levels of assistance are provided. Similarly, a steering wheel input mode can be used where the speed of the steering wheel movement is used to determine the degree of assistance required. Alternatively, a steering load mode can exist where demand for power assistance is determined by the counter-pressure of the hydraulic fluid, sensed through variations in the motor current load.

A control unit can be provided to monitor these conditions and send a control signal to the motor power circuit. Moreover, the control unit can be programmed with a plurality of algorithms which calculate the appropriate steering assist level (current) based on monitored steering system conditions in view of a selected mode. Alternatively, the control unit can host a lookup table(s) which map steering system conditions and vehicle modes, associating each with a pre-calibrated steering assist current level. Furthermore, the control unit can operate using a combination of a lookup table(s) and pre-programmed algorithms. The term MAP is used herein to reflect these types of methodologies for assessing steering system conditions and calculating power steering assist current, including, but not limited to, pre-programmed algorithms and lookup tables. In today's vehicles where multiple modes of vehicle operation can be present, it is likely that the steering control unit will include numerous pre-programmed algorithms and/or lookup tables, each interchangeably referred to herein individually as a MAP.

Complexities exist when the current delivered to the steering assist motor is modified in response to a simultaneous shift between more than two MAPs. It is relatively easy to access two MAPs and blend them together over several seconds. However, a problem occurs when the driver or vehicle changes to a third MAP while a first set of two MAPs are in the process of blending. In a steering system, the driver can readily feel changes in effort especially while turning, so that if blending the MAPs together is not performed in a controlled manner, there might be a sudden change in steering effort required. This might occur if one MAP is changed more quickly than is desirable. While delaying the institution of a new MAP until the current MAP blending is completed is an option, this protocol can cause a delayed feeling in the steering system. In this regard, the present MAP blending protocol allows for the MAP having the largest share of present time influence on the blended current signal to be reduced at a faster rate than the MAP having the lesser share.

This protocol will have benefits if applied to the electric motor assist hydraulic systems described above and in association with electric power steering (EPS). Electric power steering systems assist driver effort through the use of an electric motor which can act through a reversible gearbox and in certain cases, also an electromagnetic clutch. An electronic control unit (ECU) determines the degree of assistance that is rendered.

Electric power steering has some advantages over hydraulic steering. The reduction in engine load of an electric power steering system (it can be as low as 4 watts when the car is being driven in a straight line) means that the fuel economy of a car equipped with electric power steering is very similar to that of a car with no form of power steering. Analyses provided by manufacturers of electric power steering systems indicate potential fuel savings of 4-8 percent over cars equipped with conventional hydraulic steering, with the lighter mass of an electric power steering also having a positive impact. The independence of the system from engine operation also means that should the engine stall, steering assistance does not charge. Environmental gains are also possible from the decreased production and disposal of hydraulic fluid (worldwide, an estimated 40 million liters of power steering fluid was in use in 1995) and from the decreased requirement for the non-recyclable polymers used in hydraulic hoses.

Electric power steering also allows the steering system responsiveness to vary in different driving situations. This variation in responsiveness can be automatically controlled by a vehicle or operator selection For example, a sport mode can be provided which enhances electric power steering responsiveness through increased assist. During economy mode operation, the electric motor gives priority to vehicle efficiency. Normal mode provides standard settings for steering.

Referring to FIG. 1, an electric power steering system 10 includes a steering wheel 12 connected to an input shaft 14. The input shaft 14 is operatively connected to an output shaft 20 through a torsion bar 16. The torsion bar 16 twists in response to applied steering torque thereby permitting relative rotation between the input shaft 14 and the output shaft 20.

A position sensor 22 is operatively connected to the input shaft 14 and to the output shaft 20. The position sensor 22 in combination with the torsion bar 16 forms a torque sensor 30. A position sensor 22 determines the relative rotational position between the input shaft 14 and the output shaft 20. The torque sensor 30 provides an applied torque signal indicated at 24, to a torque signal processor 32. The torque signal processor 32 provides a signal, shown at 34, indicative of the applied steering torque.

The output shaft 20 is connected to a pinion gear 40 that engages the steering rack 42 which is operatively coupled to the vehicle's steerable wheels 46 via steering linkage (not shown) in a known manner. When the steering wheel 12 is turned, the rack and pinion gear 40 converts the rotary motion of the steering wheel 12 into linear motion of the steering rack 42. When the steering rack 42 moves in a linear direction, the steerable wheels 46 pivot about their associated steering axes.

An electric assist motor 50 is operatively connected to the steering rack 42 through a ball-nut assembly (not shown) in a known manner or other desired gearing arrangement (such as a worm and wheel, bevel gear or belt driven system). When energized, the electric assist motor 50 provides power assist to aid in steering as guided by the rotation of the vehicle steering wheel 12 by the vehicle operator.

The basic operation of an electric motor in an electric steering system 10 is well known in the art. Basically, the stator poles are energized to achieve a desired amount of motor torque in a desired rotational direction. The direction of motor rotation is controlled in response to the sequence in which the stator coils are energized in certain motor types and the direction of current flow in other motor types. The torque produced by the motor is controlled by the amount of current through the stator coils. The drive circuits typically include field affect transistors ("FETs") or other forms of solid state switches operatively coupled between the vehicle battery and the electric assist motor. Motor current can be controlled by pulse width modulation ("PWM") of the FETs.

When the electric motor 50 is energized, the motor in turn transfers a linear force to the steering rack 42. A rotor position sensor 60 is operatively connected to the motor 50 and senses the position of the rotor relative to the stator. The position sensor 60 provides a rotor position signal indicated at 62, having a value indicating that relative position between the rotor and the stator.

The electric power steering system 10 includes an electronic control unit (ECU) 70. The ECU 70 is preferably a microcomputer having suitable memory. The ECU 70 is programmed with MAPs that are operative to control the electric motor 50 in a predetermined manner in response to sensed parameters.

The ECU 70 is operatively connected to a drive circuit 80. The drive circuit 80 is operatively connected to a power supply 84 via a relay 82. The power supply 84 is operatively connected to a vehicle battery 86 and regulates electrical power supplied to the drive circuit 80. The ECU 70 provides a voltage control output signal indicated at 90, to the drive circuit 80. The voltage control output signal is indicative of the voltage to be supplied to each phase of the electric motor 50, as determined by the MAPs programmed in the ECU 70.

A voltage/current monitor 100 monitors the motor current provided to the electric motor 50 and provides a measured motor current signal of each phase to the ECU 70. These measured motor current signals are indicated at 102. The rotor position sensor 60 and the torque signal processor 32 provide the rotor position signal and the sensed torque signal, respectively, to the ECU 70. A vehicle speed sensor 104 provides a vehicle speed signal, indicated at 106, to the ECU 70. Other inputs, indicated generally at 114, may also be provided to the ECU 70 for control, safety, or system monitoring purposes.

The steering system conditions monitored by the ECU 70 and fitted to the MAPs include a torque control loop 120, a motor control loop 130, and a current control loop 140. The torque control loop 120 is operative to determine a requested torque command signal indicated at 126. The torque command signal is indicative of the amount of steering assist torque required from the electric motor 50, based at least partially on the sensed steering applied torque and the sensed vehicle speed. The torque control loop 120 provides the torque command signal to the motor control loop 130.

The present disclosure is also highly suitable for use with steer-by-wire systems. In steer-by-wire systems, the steering wheel does not have a direct mechanical connection to the road wheels. Rather, the steering wheel is used to produce control signals that are transmitted to electric drive motors and actuators that are used to turn the road wheels. Typically, the angular rotational displacement of a shaft connected to the steering wheel is detected by sensors, such as position and torque sensors, and converted into an electric signal or plurality of signals. This electronic signal is processed and applied to an electric motor that is connected to and controls the angular positioning of the road wheels of the vehicle with respect to the position of the vehicle body. The road wheels are then moved according to the signal received by the motor to effect the steering of the vehicle. Because steer-by-wire steering control systems do not have a direct mechanical connection to the steered wheels, the vehicle operator does not inherently receive the tactile feedback that is provided by conventional systems. Therefore, it is desirable to incorporate mechanisms into steer-by-wire steering control systems that are adapted to provide input to a vehicle operator that simulate some of the tactile feedback characteristics of a conventional steering system. As with electric assisted hydraulic and EPS systems, it is desirable to provide modified current to the electric motor to address variations in driving conditions and/or selections made by the driver to create a desirable steering response.

Figure 2:
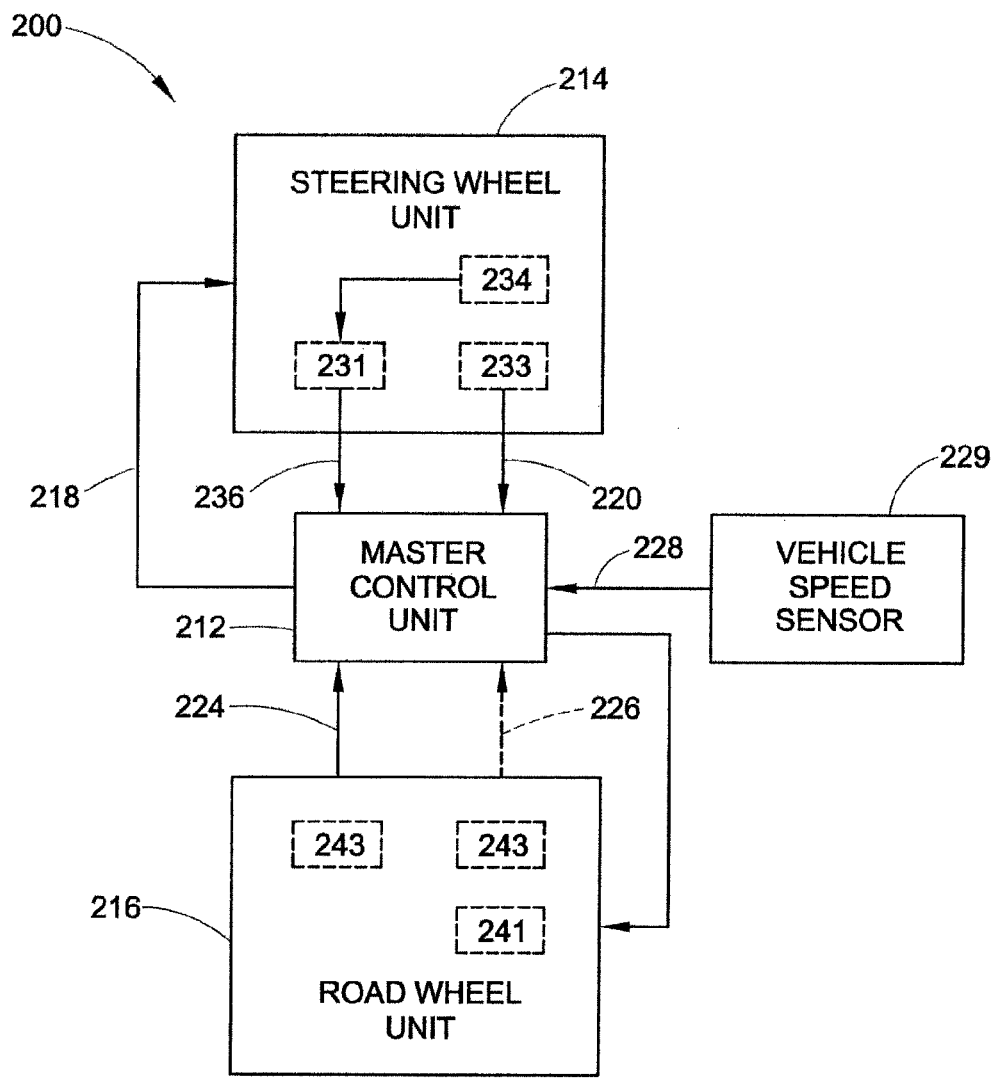
FIG. 2 is a block diagram illustration of an automotive vehicle steer-by-wire system.

Referring to FIG. 2, there is shown a steering control system for a vehicle. The steering system 200 comprises several closed loop subsystems that work together to provide an operator with control over the direction of the vehicle.

A steering wheel unit 214 detects the position and movement of a steering wheel (not shown) with a steering wheel position sensor 233 and sends a steering wheel position signal 220 to the master control unit 212.

The steering wheel unit 214 is a closed loop control system that uses steering wheel torque signal 236 as the feedback to control a steering wheel actuator 234. The steering wheel torque command signal 218 is received from the master control unit 212. The steering wheel torque command signal 218 is compared to the internally generated feedback steering wheel torque signal 236 to yield a torque error signal as needed to comply with the steering wheel torque command signal 218 and maintain the stability of the steering wheel unit 214 control system. The steering wheel actuator 234 contains the necessary elements to provide a reaction torque to the operator as well as a torque sensor 231 to provide feedback, the steering wheel torque signal 236 to the steering wheel unit 214 and the master control unit 212. A steering wheel position sensor 233 is also included that produces a steering wheel position signal 220. Generally, reaction torque will be imparted to the operator by an electric motor coupled either to the steering column or the rack (not shown).

The master control unit 212 combines the information of the steering wheel position 220 with a speed signal 228 from the vehicle speed sensor 229 and the tie rod force signals 224, 226 (one each for a left and right wheel) from the road wheel unit 216. The master control unit 212 processes these signals to compensate for signal spectral content and produces a steering wheel torque command signal 218, which is sent to the steering wheel unit 214. In one embodiment, the master control unit 212 combines the tie rod force signals 224, 226 to generate a composite tie-rod force signal.

The road wheel unit 216, like the steering wheel unit 214, is also a closed loop control system that uses a road wheel position signal detected by a road wheel position sensor 241 as a feedback signal to control a road wheel actuator thereby, controlling the direction of the vehicle. There may typically be a road wheel unit 216 for each steerable wheel, though only one is shown in the FIG. 2. A tie rod sensor 243 is also located within road wheel unit 216. The tie rod sensor 243 detects and measures the forces on the tie rods and sends signals (224 for one wheel, 226 for the other) representative of the measured forces to the master control unit 212.

The master control unit 212 includes processing means to index the composite tie-rod force relative to one or more torque MAPs. Where more than one MAP is used, such as vehicle speed 228 the outputs are can be blended based upon various input signals. For example, two MAP tables might be used, one for low speeds and one for highway speeds. As the vehicle speed signal increases, the table for highway speeds becomes increasingly dominant in the blend over the table for low speeds. The indexed signal is applied to a frequency based compensator (not shown) to generate the steering wheel torque command signal 218. Similarly, based on an operator or vehicle selected mode, an economy based MAP and a performance based MAP may be implemented by the master control unit 212.

Many vehicle conditions can be monitored and compared to the established steering MAPs from which the corresponding output current supplied to the steering assist motor is determined. These include monitoring of the steering force, vehicle speed, engine RPM, and turning limits. Furthermore, it may be desirable to provide operator selectivity in the steering system. Moreover, steering responsiveness preferences are highly individual. Accordingly, it may be desirable for the operator to select between modes such a as highly responsive sport setting, a soft comfort setting, and a normal setting which is between sport and soft.

Typically, the process may involve setting a proper base current setting for a selected mode using, for example, the steering force signal from a torque sensor and/or the vehicle speed and/or the engine speed. Various corrections are then performed to adjust the base current. The base current can be modified based on inertia correction which compensates for the influence caused by the motor body of revolution inertia (insufficient torque when starting while torque continues when stopping). Damping correction which reduces vibration transmitted from the road surface. The damping and inertia corrections cause the base current to be either increased or decreased. To prevent malfunction of the steering system due to overheating (due to motor over-speed or other features), the steering mechanism turning limit and a cumulative value of the motor current can also be detected and the current output to the steering motor varied accordingly.

A plurality of MAPs can be stored in the steering system ECU (or another controller associated with the vehicle). The plurality of MAPs include current settings based upon operator and/or vehicle selected mode as guided by the sensed conditions. It is noted that the disclosure is not intended to be limited solely to the particular sensed conditions described herein but contemplates others which the skilled automotive engineer may deem appropriate.

Figure 3:
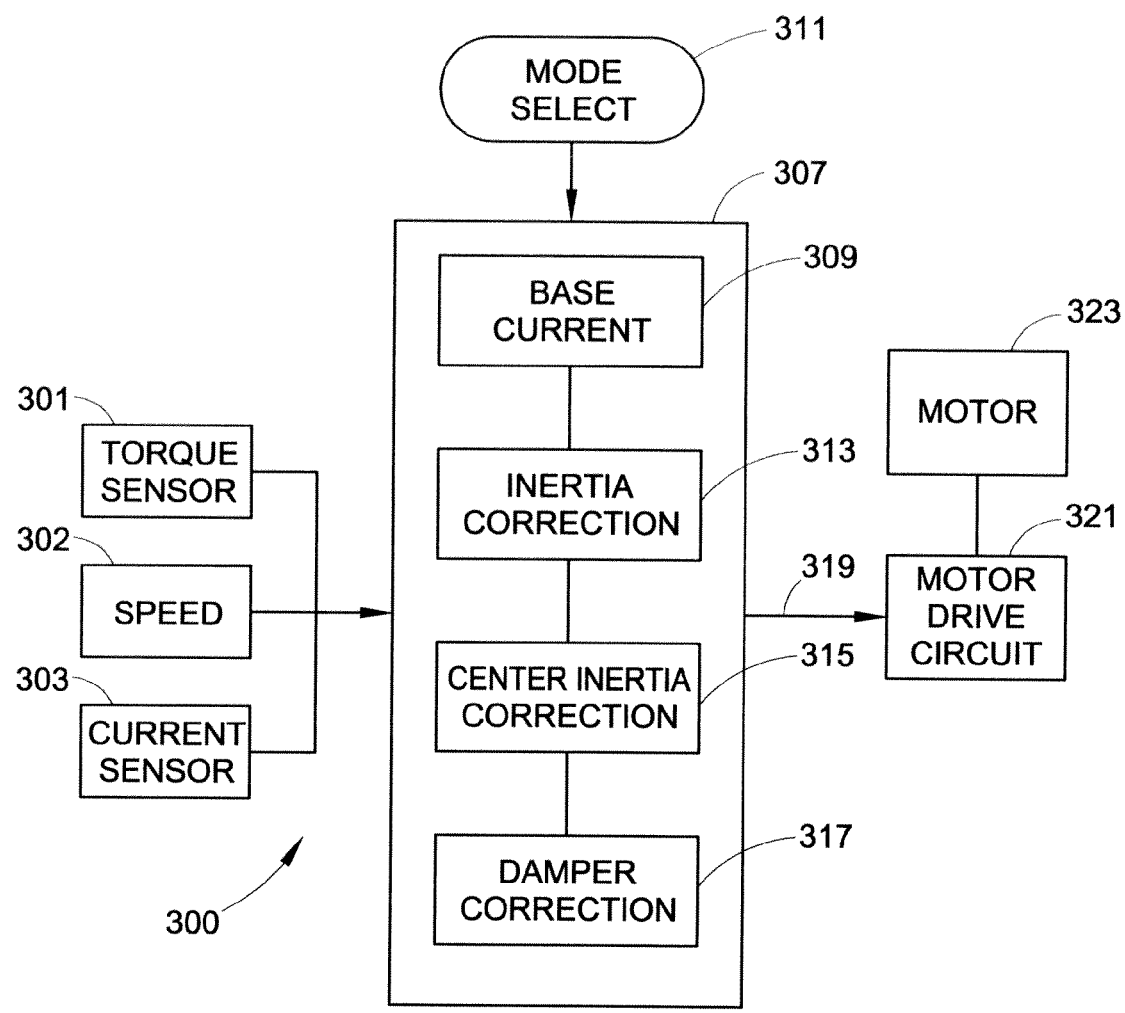
FIG. 3 is a flow chart illustration of data flow within a power steering electronic control unit.

FIG. 3 shows several inputs (base current, inertia correction, damper correction) used in creating a desired feel in the steering system. As illustrated, the EPS system 300 includes a torque sensor 301, speed sensor 302, and a current sensor 303 providing vehicle conditions fitted to a MAP intended to provide a particular steering condition. More particularly, torque sensor 301, speed sensor 302, current sensor 303 provide quantitative vehicle conditions to the ECU 307 which establishes a power assist base current 309 based on the stored MAPs. The base current 309 can be calculated based on the vehicle conditions in view of MAPs which vary according to a driver selected steering mode (example comfort, sport, standard) and/or automatically dictated by vehicle driving conditions such as snow, rain, or ice or even driver's skill as described herein below. This selection is communicated to the ECU 307 via a mode selection 311.

The base current 309 is then modified using the various MAPs associated with, for example, inertia correction 313, center inertia correction 315, and damper correction 317 to render a final signal 319 communicated to the motor drive circuit 321, resulting in a final current distribution to the power steering motor 323.

Figure 4:
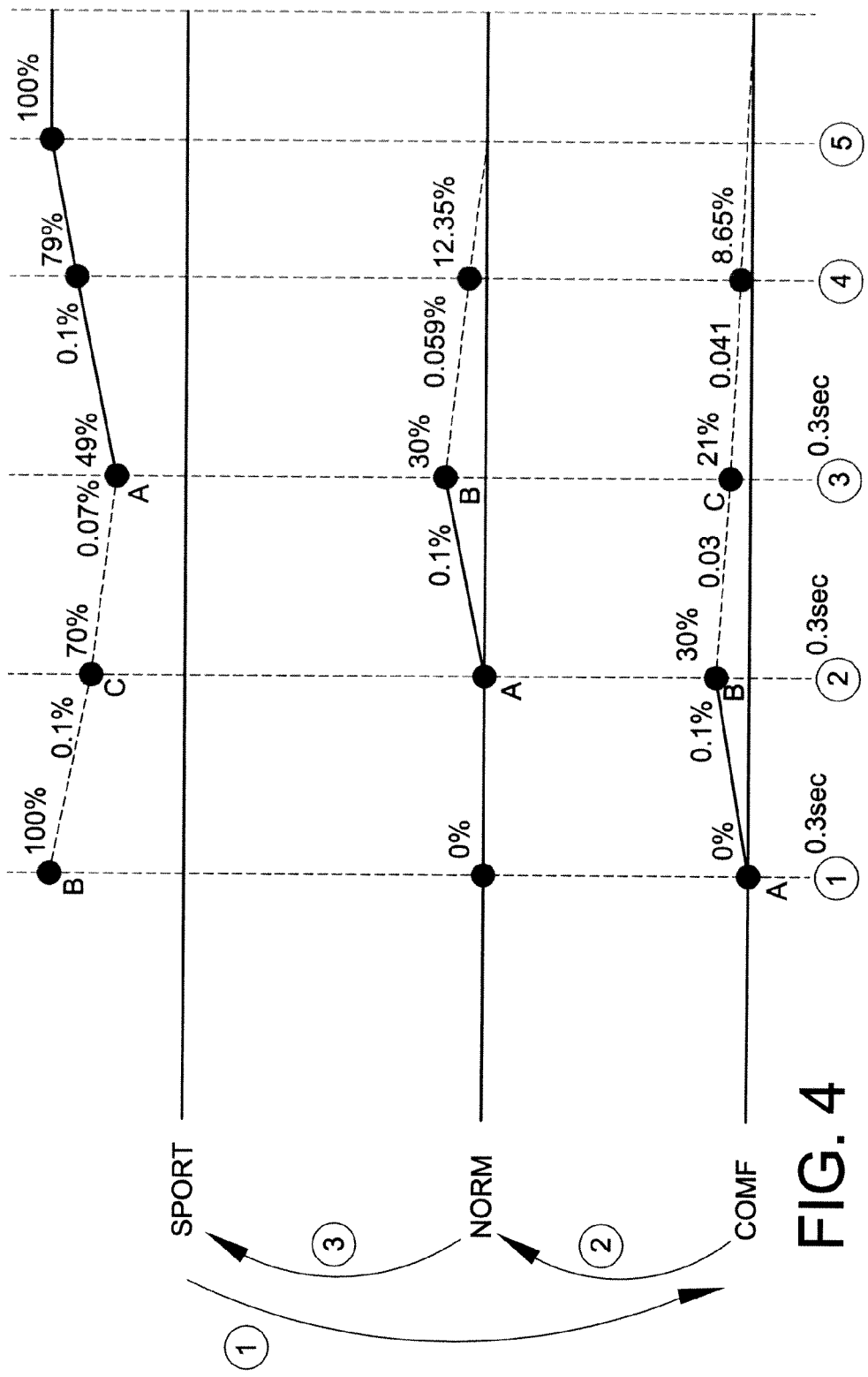
FIG. 4 is a graphical depiction of a map switching protocol.

Referring now to FIG. 4, the MAP blending protocol of the present disclosure is graphically depicted. A shift in mode occurs at time 1 from sport mode to comfort mode. Accordingly, at time 1 the sport mode MAP represents 100% of the drive current signal. Subsequent to time 1, the steering system ECU begins blending the sport mode MAP with the comfort mode MAP and the current signal is modified. For representative purposes, the protocol associated with FIG. 4 sets the blending time period for MAP blending between modes at approximately one second. Moreover, the protocol is constructed to from one fully engaged mode to a newly selected mode in approximately one second. It is noted that this time frame is representative only and that the disclosure is not limited thereto.

At time 2, approximately 0.3 seconds into the conversion from sport mode to comfort mode, a vehicle or operator directed mode switch from comfort mode to normal mode is made. At time 2, sport mode MAP represents approximately 70% of the blended current signal while the newly engaging comfort mode MAP represents approximately 30% of the blended current signal. Subsequent to time 2, the ECU begins blending of the old sport mode MAP, the old comfort mode MAP and the newly selected normal mode MAP. Rather than decrease existing comfort mode MAP and sport mode MAP at equal rates while the ECU works to achieve a fully normal mode MAP, the ECU decreases the MAP controlling the largest portion of the blended MAP (i.e., sport MAP) at a proportionally faster rate than the MAP controlling a smaller portion of the blended MAP (i.e., comfort MAP). More specifically, sport mode MAP which occupies 70% of the blended MAP at time 2 is decreased faster than comfort mode MAP which occupies 30% of the blended MAP at time 2, with normal mode MAP increasing in accord with the goal of achieving 100% normal mode MAP within about one second. Moreover, the efficient blending protocol can be achieved according to the formula:

rising rate of the new MAP (RR per millisecond) equals 100%/time in milliseconds required for complete transition to new MAP falling rate of the old MAP (FR per millisecond) equals $[X/((100-Y)/RR)]$ wherein X=existing blend percent of the old MAP; and
Y=existing blend percent of the new MAP.

To further illustrate the MAP blending protocol, at time 3, where each of the sport mode MAP, comfort mode MAP and the normal mode MAP have an influence on the current signal, an operator or vehicle selected change from normal mode to sport mode is made. Each of the deselected normal and comfort MAPs are decreased in proportion to their component of the overall blended map. Accordingly, comfort mode is decreased at the rate of 0.041% per millisecond from 21% at time 3 to 8.65% at time 4. Normal mode MAP is decreased at the rate of 0.054% per millisecond from 30% of the blended current signal to 12.35% of the current blended signal, while sport mode MAP has increased from 49% of the blended current signal at a rate of 0.1% per millisecond to 79% of the blended current signal at time 4.

At time 5 blending of comfort, normal and sport mode MAPs has been completed and sport mode MAP controls 100% of the current motor signal.

In addition to vehicles having driver selected driving modes, many vehicles, particularly electric and hybrid vehicles, may have internally governed drive modes to achieve, for example, adequate driving range. The motor may be automatically controlled to provide varying levels of assistance at different operating conditions. For example, greater assistance may be provided at operating conditions where the benefit of the assistance (e.g., on reduced emissions, increased fuel economy, increased power, etc.) is higher, and less assistance may be provided at operating conditions where the benefit of the assistance is lower. Assistance provided and/or the operating conditions at which assistance is provided may be varied based on the power available to drive the motor and/or an expected driving range (e.g., a distance that the vehicle is expected to be driven between charges, such as for a plug-in hybrid vehicle). In this regard, the automotive vehicle may include an energy conservation mode which automatically governs current availability to the steering system to ensure a sufficient state of charge is maintained to allow anticipated travel to be completed.

Similarly, vehicles may be equipped with engine idle stops. Idle stop systems save fuel by shutting down a vehicle's engine automatically when the car is stationary and restarting it when the driver resumes driving. Especially in urban areas, drivers often let their car's engine idle at traffic lights or when stopped in traffic jams. Switching off the engine to stop it idling in these situations enhances fuel economy. During engine idle stop it is feasible that the current supply to the electronic steering system will be similarly halted. Accordingly, at termination of engine idle stop mode, the MAP dictating current supply to the power steering assist motor will be phased back into operation. If the vehicle or the vehicle's operator elects to make a mode change or multiple mode changes during this event, the MAP blending protocol of the present disclosure can be beneficial.

In addition, it has been proposed to provide an electric power steering system that estimates the skill of the driver and provides steering assistance to match. A driver skill estimation device can have inputs from one or more of a GPS system; a vehicle speed sensor; a steering sensor that provides information on steering angular speed, angular acceleration and a torque input; a brake pedal sensor that detects stroke, speed and force; a throttle pedal sensor that detects accelerator stroke and speed; a yaw rate sensor; and a road friction estimate input.

The driver skill estimation device analyzes the actual path taken by the vehicle and compares this with a computed target trajectory. Using this and data on the vehicle wheelbase, the distance that the front and rear wheels are from the vehicle center of gravity (and other factors) the system awards the driver an ability that varies rom the very poor to very good. A very good driver may be rewarded with very little steering force resistance (the driver gets what he or she asks for), while a poor driver will encounter steering that actively does not allow major steering inputs to be made at high speed which prevents the vehicle operator from over-reacting to the vehicle response and so stabilizes the vehicle. The vehicle steering system ECU can receive input from the driver skill estimation device and select and blend appropriate MAPs to provide a suitable drive current to the electric steering system motor.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A control method for a steering system of an automotive vehicle, said control method comprising:
providing an ECU storing a plurality of steering MAPs;
providing an electric motor in association with said steering system, wherein a current supplied to said motor is adjusted based upon the selection of a particular steering MAP;
wherein upon change from a first MAP to a second MAP, MAP blending is performed according to the following parameters:
rising rate (RR) of the second MAP equals 100%/time in milliseconds required to complete transition to the second MAP;
falling rate (FR) of the first MAP equals [(X)/((100%−Y)/RR)], wherein X is the existing blend percentage of the first MAP and Y is the existing blend percentage of the second MAP; and
wherein the first and second MAPs are blending at the time a third MAP is selected.

2. The method of claim 1, wherein said vehicle includes an electronic power steering system.

3. The method of claim 1, wherein said vehicle includes a steer-by-wire system.

4. The vehicle of claim 1, wherein at least two of said steering MAPs are associated with a driver selected driving mode.

5. The vehicle of claim 1, wherein at least two of said steering MAPs are associated with a vehicle selected driving mode.

6. The method of claim 1, wherein the contribution of the new MAP to a blending map increases at a RR for the new MAP, and wherein the contribution of each of the two old MAPs to the blending map decreases an FR specifically determined for the old MAP.

7. A control method for an automotive vehicle steering system including an electric motor providing a steering force on a steering mechanism, the method comprised of providing at least three steering system MAPs which control an electric current supplied to said electric motor, wherein when a first MAP is selected to replace a second MAP and in response to selecting a new third MAP when, the at least two prior deselected first and second MAPs are still blending, the input of the deselected MAP comprising the greatest component of the blending at the time the new third MAP is selected is decreased at a faster rate than the deselected MAP comprising the lesser component of the blending.

8. The method of claim 7, wherein said steering system is a steer-by-wire system.

9. The method of claim 7, wherein said system is an electronic power steering system.

10. The method of claim 7, wherein at least one steering system MAP is associated with a driver skill estimation device.

11. The method of claim 7, wherein said MAP is associated with at least one driver selected steering mode.

12. The method of claim 7, wherein said MAP is associated with at least one vehicle selected steering mode.

13. The method of claim 12, wherein said vehicle is an electric vehicle and said vehicle selected steering mode is selected to conserve state of charge.

14. The method of claim 7, wherein said MAP is associated with a vehicle engine idle stop.

15. The method of claim 7, wherein said MAP includes at least one of a damper correction and an inertia correction.

16. The method of claim 7, wherein more than two MAPs are blending when the new MAP is selected and each MAP's contribution to a new blend is decreased at least substantially proportionally to its component of the blend at the time the new MAP is selected.

17. The method of claim 7, further comprising:
for each of the deselected MAPs, determining the rate with which to decrease the deselected map, the rate being equal to [(X)/((100%−Y)/RR)], where X is the existing blend percentage of the deselected MAP, Y is the existing blend percentage of the new MAP, and RR is the rate with which to increase the blend percentage of the new MAP.

18. An automotive vehicle including a steering system having an electric motor receiving a current from a drive circuit, said drive circuit receiving a control signal from an electronic control unit, said electronic control unit comprised of a data processor including a computer program designed to select a current for the electric motor and provide a control signal to said drive circuit, said computer program associating vehicle operating conditions with a MAP associated with a vehicle drive mode, wherein said computer program selectively reduces the largest component of a blending MAP at a rate faster than a smaller component of the blending MAP when a new MAP is selected.

19. The vehicle of claim 18, wherein said vehicle operating conditions include at least one of vehicle speed, steering system torque, damper correction and inertia correction.

20. The vehicle of claim 18, wherein said vehicle drive mode is selected from at least one of sport, comfort and normal.

21. The vehicle of claim 18, wherein each MAP being reduced as a component of the blending MAP reach a 0% contribution to the new MAP at substantially the same time.

22. The vehicle of claim 18, wherein said computer program, for each of the blending map components to be reduced, determining the rate with which to reduce the component, the rate being equal to [(X)/((100%−Y)/RR)], where X is the existing blend percentage of the component, Y is the existing blend percentage of a new MAP, and RR is the rate with which to increase the blend percentage of the new MAP.

* * * * *